US012388200B2

(12) United States Patent
Arbuckle

(10) Patent No.: US 12,388,200 B2
(45) Date of Patent: Aug. 12, 2025

(54) FASTENING DEVICE

(71) Applicant: Linian Lab Ltd., Glasgow (GB)

(72) Inventor: Wesley Arbuckle, Glasgow (GB)

(73) Assignee: Linian Lab Ltd., Glasgow (GB)

( * ) Notice: Subject to any disclaimer, the term of this patent is extended or adjusted under 35 U.S.C. 154(b) by 408 days.

(21) Appl. No.: 17/801,257

(22) PCT Filed: Feb. 23, 2021

(86) PCT No.: PCT/GB2021/050446
§ 371 (c)(1),
(2) Date: Aug. 21, 2022

(87) PCT Pub. No.: WO2021/170991
PCT Pub. Date: Sep. 2, 2021

(65) Prior Publication Data

US 2023/0006371 A1 Jan. 5, 2023

(30) Foreign Application Priority Data

Feb. 24, 2020 (GB) ..................................... 2002534

(51) Int. Cl.
*H01R 4/66* (2006.01)
*H01R 4/16* (2006.01)
(Continued)

(52) U.S. Cl.
CPC ................ *H01R 4/66* (2013.01); *H01R 4/26* (2013.01); *H01R 4/48* (2013.01); *H01R 43/16* (2013.01); *H01R 4/38* (2013.01)

(58) Field of Classification Search
CPC ... H01R 4/26; H01R 4/38; H01R 4/48; H01R 4/64; H01R 4/66; H01R 43/16
See application file for complete search history.

(56) References Cited

U.S. PATENT DOCUMENTS 1,531,916 A 3/1925 Flintjer
2,563,240 A 8/1951 Heath
(Continued)

FOREIGN PATENT DOCUMENTS

EP 0105865 A2 4/1984
EP 0433621 A2 6/1991
(Continued)

OTHER PUBLICATIONS

International Search Report, PCT/GB2021/050446, EPO (May 27, 2021).

(Continued)

*Primary Examiner* — Abdullah A Riyami
*Assistant Examiner* — Thang H Nguyen
(74) *Attorney, Agent, or Firm* — Wright IP & International Law; Eric G. Wright

(57) ABSTRACT

Herein is described a n electrical earthing device formed from a sheet of material and comprising: an earthing device connector portion, for connection of the earthing device to a component to be earthed; and an earth cable connector portion, for connection to an earth cable. A first part of the earth cable connector portion is disposed in relation to a second part of the earth cable connector portion so as to define a clamping mechanism. In use, an earth cable positioned between the first and second parts is retained in position and maintained in electrical contact with the clamping mechanism by resilient biasing between the first and second parts of the clamping mechanism.

14 Claims, 7 Drawing Sheets

(51) Int. Cl.

| | |
|---|---|
| ***H01R 4/26*** | (2006.01) |
| ***H01R 4/48*** | (2006.01) |
| ***H01R 43/16*** | (2006.01) |
| *H01R 4/38* | (2006.01) |

(56) References Cited

U.S. PATENT DOCUMENTS

| | | | | |
|---|---|---|---|---|
| 3,633,250 | A | 1/1972 | Romney | |
| 3,737,128 | A | 6/1973 | Schuplin | |
| 4,260,122 | A | 4/1981 | Fiala | |
| 4,294,156 | A | 10/1981 | McSherry et al. | |
| 5,845,883 | A | 12/1998 | Meyer | |
| 5,906,346 | A | 5/1999 | Lin et al. | |
| 5,938,484 | A * | 8/1999 | Beege | H01R 4/4816 439/828 |
| 6,161,804 | A | 12/2000 | Paske et al. | |
| 6,276,644 | B1 | 8/2001 | Jennings et al. | |
| 6,296,430 | B1 | 10/2001 | Fischer | |
| 6,742,760 | B2 | 6/2004 | Blickhan et al. | |
| 6,761,597 | B2 * | 7/2004 | Shimizu | H01R 13/11 439/852 |
| 6,893,286 | B2 * | 5/2005 | Drewes | H01R 4/4821 439/441 |
| 6,896,461 | B2 | 5/2005 | Fleydervish et al. | |
| 8,092,129 | B2 * | 1/2012 | Wiley | F16B 43/00 411/160 |
| 8,496,420 | B2 * | 7/2013 | Aoki | F16B 21/075 411/553 |
| 9,065,191 | B2 * | 6/2015 | Martin | H01R 11/26 |
| 9,488,208 | B2 | 11/2016 | Hemingway et al. | |
| 10,047,775 | B2 | 8/2018 | Bruckbauer et al. | |
| 10,141,662 | B2 * | 11/2018 | Bernard | H01R 4/36 |
| 10,894,516 | B2 * | 1/2021 | Benedetti | F16B 5/0657 |
| 2002/0066833 | A1 | 6/2002 | Ferrill et al. | |
| 2003/0021655 | A1 | 1/2003 | Correll et al. | |
| 2005/0042912 | A1 * | 2/2005 | Drewes | H01R 4/4821 439/441 |
| 2005/0069398 | A1 | 3/2005 | Arbuckle | |
| 2013/0090004 | A1 * | 4/2013 | Corbett | H01R 4/5025 439/775 |
| 2014/0017025 | A1 | 1/2014 | Hemingway et al. | |
| 2014/0242853 | A1 * | 8/2014 | Martin | H01R 4/26 439/781 |
| 2015/0101150 | A1 | 4/2015 | Harvey | |
| 2015/0330560 | A1 | 11/2015 | Zhang | |
| 2016/0281881 | A1 | 9/2016 | Vaccaro et al. | |
| 2018/0163899 | A1 * | 6/2018 | Rajpal | F16L 3/2235 |
| 2020/0287367 | A1 * | 9/2020 | Gibson | H02G 3/0683 |

FOREIGN PATENT DOCUMENTS

| | | | | |
|---|---|---|---|---|
| FR | 2694141 | A1 | 1/1994 | |
| GB | 2577501 | A | 4/2020 | |
| WO | 2017149271 | A1 | 9/2017 | |
| WO | WO-2019239024 | A1 * | 12/2019 | H01R 4/4818 |

OTHER PUBLICATIONS

Search Report, GB2002534.2, IPO (Aug. 24, 2020).

Examination Report Under Section 18(3), GB2002534.2, IPO (Oct. 31, 2022).

Examination Report Under Section 18(3), GB2002534.2, IPO (May 3, 2022).

International Search Report, PCT/GB2018/052422, EPO (Dec. 6, 2018).

International Search Report, PCT/GB2017/050407, EPO (Apr. 28, 2017).

* cited by examiner

FASTENING DEVICE

CROSS-REFERENCE TO RELATED APPLICATIONS

This application is a US National Stage Entry of PCT/GB2021/050446 titled "Fastening Device" filed Feb. 23, 2021, which claims benefit of foreign priority to GB 2002534.2 filed Feb. 24, 2020, and titled "Fastening Device". This application claims benefit of foreign priority to GB 2002534.2 filed Feb. 24, 2020, through PCT/GB2021/050446 filed Feb. 23, 2021.

INCORPORATION BY REFERENCE

This US National Stage Entry incorporates by reference in its entirety copending PCT Application No. PCT/GB2021/050446 titled "Fastening Device" filed Feb. 23, 2021, which incorporates by reference in its entirety GB 2002534.2 filed Feb. 24, 2020, and which is titled "Fastening Device". GB 2002534.2 filed Feb. 24, 2020, is incorporated by reference herein in its entirety.

FIELD OF THE INVENTION

The present invention relates to a fastening device. In particular, but not exclusively, the invention relates to a fastening device for electrically earthing an electrical cable.

BACKGROUND OF THE INVENTION

Steel wire armoured (SWA) cable is a power cable normally used for the supply of mains electricity. It is usually found in underground systems and cable ducting. SWA cables normally comprise standard insulated electrical cables, which are covered externally by a steel wire armoured mechanical protection. This armour provides protection for when the cable is underground, allowing it to be buried for extended periods of time whilst withstanding underground conditions.

The steel armour wire is normally connected to an earth cable or wire as it is used as a safety mechanism to prevent inadvertent electrocution. If one were to accidentally cut through the SWA cable and into a live wire, the steel armour would provide an earth/escape route for the current: thereby preventing electrocution.

When a SWA electrical cable terminates at a junction box or appliance (for connection to the mains supply for example), a SWA cable gland is normally used. Glands have a compression fitting on one end to clamp the steel armour wires, and a threaded shaft which passes through into the junction box or appliance on the other end. A fastener, such as a nut, is then secured onto the end of the threaded shaft to secure the gland to the junction box or appliance wall.

It is necessary to earth at least one end of the SWA cable to comply with safety regulations in many jurisdictions. To achieve this, previously a "banjo washer" or an "earth tag" is placed over the threaded shaft of the cable gland and clamped in place by a nut. The banjo washer/earth tag is typically made from a conductive material such as copper or brass. A crimped connector is attached to the end of an earth cable, and the crimped connector then separately bolted to a hole in an arm extending from the side of the banjo washer. This establishes electrical communication between the earth cable and the SWA cable, via the fastener and the gland.

The multi-step procedure for fastening the crimped connector first to the earth cable and then to the banjo washer is relatively time consuming. Moreover, both of these connections to the crimped connector are prone to installation errors which might give rise to a loss of electrical connection over time.

It has been proposed to provide a cable gland which enables the earth cable to be directly bolted onto the fastener (WO 2006018653 A1). Although the integrated nut of WO 2006018653 A1 avoids the need for a separate banjo washer, a crimped connector is still used and still required essentially the same number of installation steps. This installation process is still difficult and time consuming and requires the use of a tool, and small components (crimped connector and screw) to fix on the earth cable. The design is also relatively complex and costly to manufacture.

There remains a need to at least mitigate at least one or more of the aforementioned problems of connecting earth cables.

Although the problem above has been described in relation to SWA cables, analogous problems may also arise in relation to connecting other types of electrical cable.

SUMMARY OF THE INVENTION

According to a first aspect of the present invention there is provided an electrical earthing device; the electrical earthing device being formed from a sheet material and comprising:

- an earthing device connector portion, for connection of the earthing device to a component to be earthed; and
- an earth cable connector portion, for connection to an earth cable;
- wherein a first part of the earth cable connector portion is disposed in relation to a second part of the earth cable connector portion so as to define a clamping mechanism; and
- wherein the first and second parts are resiliently deformable in relation to one another for the said earth cable to be positioned therebetween, and wherein in use, an earth cable positioned between the first and second parts is retained in position and maintained in electrical contact with the clamping mechanism by resilient biasing between the first and second parts of the clamping mechanism.

The clamping mechanism provides a secure mechanical connection between the component to be earthed and the earth cable. This also provides a robust electrical connection. The electrical connection can be simply established by deflecting the first and second parts to admit the earth cable therebetween, for example by prying using a tool such as a screwdriver or in some embodiments manually or forcing the earth cable between the first and second parts such that the cable itself deflects the first and second parts. Disconnection of an earthing cable can similarly be simply accomplished, by prying or otherwise deflecting the first and second parts.

Furthermore, the electrical earthing device is formed from a sheet of material. In comparison to conventional devices comprising cast or moulded parts, the electrical earthing device can be efficiently and quickly manufactured using a minimum of materials and energy.

The electrical earthing device may be formed from a single sheet of material. That is to say, the electrical earthing device may be of unitary construction. The electrical earthing device may furthermore lack additional parts such as grub screws or other means of adjustment or clamping of a cable effected by separate parts.

The device may further lack welds or other joins between separate pieces of material or components.

By "formed from a sheet of material" we refer to manufacture by bending, roll forming, stamping, pressing and the like. Manufacturing processes such as extrusion, moulding or casting are excluded. A skilled person will be immediately able to recognise characteristics of a device formed from a sheet of material; such as a material thickness throughout all portions of the device characteristic of the sheet material; and/or folds, bends or the like which if reversed would result in a planar article. A device formed from a sheet material may also typically be rendered or represented as a two-dimensional pattern or outline on a sheet material.

The sheet material may be an electrically conductive material, such as steel. The device may be made from metal or a metal alloy, such as copper or brass. The sheet material may alternatively or in addition be provided with a conductive coating, such as a brass or zinc coating. A conductive coating may be provided to enhance conductivity. The invention extends in an aspect to a method of making an electrical earthing device as disclosed herein, comprising providing a sheet material and conducting one or more steps of one or more of bending, roll forming, stamping and pressing the sheet material to form said electrical earthing device.

The method may comprise coating the sheet material.

The method may comprise creating an outline of a device pattern on a sheet of material, for example by machining or stamping, and subsequently conducting one or more steps of one or more of bending, roll forming, stamping and pressing the sheet material to form said electrical earthing device.

The method may comprise creating a plurality of devices from a single sheet of material.

The method may comprise creating an outline of the plurality of said devices, for example by stamping or machining "blanks" from a single sheet of material and then conducting the one or more steps of one or more of bending, roll forming, stamping and pressing the sheet material to form each said electrical earthing device.

The component to be earthed may be a cable gland. The cable gland may be a SWA cable gland, or an earth rod, or the like. The component to be earthed may be any other component which requires to be earthed.

The cable gland may comprise a male threaded fastener and corresponding female threaded fastener. Alternatively, the cable gland may comprise push-fit fasteners.

The earthing device connector portion may be shaped to fit onto a cable gland. The earthing device connector portion may be a washer. The washer may be a full circular shape, or a part-circular shape. The connector portion may have a forked feature to connect onto a cable gland. In use, the earthing device connector portion may be directly or indirectly connected to the cable gland. The earthing device may, in use, be connected between male and female components of the fastener.

The earthing device connector portion may be for encircling, at least in part, the male threaded fastener of the cable gland. The connector portion may be held in place by compressive force, between the male and female threaded fasteners of the cable gland.

The earth cable connector portion may comprise at least one bend. There may be a plurality of bends. There may be one continuous bend.

The earth cable connector portion may extend from a proximal end, by which the earth cable connector portion is coupled to the earthing device connector portion, to a distal end. The earth cable connector portion may comprise a said bend at or adjacent to the proximal end and/or at or adjacent to the distal end.

At least one of the first and second parts may be toward the distal end of the earth cable connector portion. Both the first and second parts may be toward the distal end of the earth cable connector portion. The first part may extend from the proximal end, and the second part may extend from the distal end. The first part may extend from the earthing device connector portion.

At least one intermediate part may be located between the first and second parts.

The at least one intermediate part may connect the first and second parts. The intermediate part may comprise bends, the bends forming the geometry of the device. The bends may be formed to adjust the size of the device, for example to accommodate a range of sizes/diameters of earth cables.

The earth cable connector portion may comprise an earth cable aperture. For example, in use an earth cable may extend to the clamping mechanism via an aperture or via more than one aperture in the earth cable connector portion.

The earth cable aperture may form part of the clamping mechanism.

The earth cable aperture may be located on the first part or on the second part of the earth cable connector portion. The earth cable may pass through the earth cable aperture before entering into the clamping mechanism. The earth cable may, in use, pass through the clamping mechanism, before exiting via the earth cable aperture.

There may be more than one earth cable aperture. In embodiments comprising more than one earth cable aperture, the earth cable may, in use, extend through both a first and at least a second earth cable aperture, to the clamping mechanism. The earth cable may, in use, extend through at least a first earth cable aperture to the clamping mechanism and through at least a second earth cable aperture.

A part of the earth cable connector portion may comprise a slot, to allow another part of the earth cable connector portion to extend therethrough. One part of the earth cable connector portion may extend through another part of the earth cable connector portion, when the earth cable connector portion is not in a resiliently deformed state. One part of the earth cable connector portion may, in use, be resiliently deformed so as to extend through another part of the earth cable connector portion.

For example, the first part of the earth cable connector portion may comprise a slot to allow at least a portion of second part of the earth cable connector portion to pass through it (or vice versa). The slot may be any shape and may extend fully to the edge of the earth cable connector portion, to create a channel (that is to say, the slot may be open, to one side for example). The slot may be sized to allow at least a portion of the second part of the earth cable connector portion to extend through the first part.

In another example, one part of the earth cable connector portion (for example the first part) may comprise said earth cable aperture and another other part of the earth cable connector portion (for example the second part) may comprise the slot.

To attach the earth cable in this example, the first part must first be passed through the second part, before inserting the earth cable into the earth cable aperture (for example the earth cable connector portion may be manufactured to adopt this configuration). When the earth cable connector portion is not in a resiliently deformed state, the first part may be positioned such that the earth cable aperture is to a first side of the second part. In this configuration, the first part may extend at least partially through the slot.

The earth able connector portion may be deformable to a resiliently deformed state in which the first part extends through the slot and is positioned such that the earth cable aperture is to a second side of the second part. An earth cable may then be passed through the aperture and the earth cable connector portion allowed to return towards the non-resiliently deformed state, thereby clamping the earth cable through the aperture against the second side of the second part.

That is to say, as the first and second part are resiliently deformable in relation to one another, upon release of the second part, it will attempt to return to its original shape (although will be prevented from doing so entirely due to the presence of the earth cable). The first and second parts, the earth cable aperture and the slot will together form the clamping mechanism, the remaining resilient biasing forces being applied between the first and second parts thereby attaching the earth cable to the device.

The earth cable connector portion may comprise an adjustment feature, wherein the adjustment feature may comprise an adjustor which is capable of adjusting the biasing force of the clamping mechanism. For example, the adjustment feature may be a grub screw assembly, wherein the adjustor is a grub screw. The adjustor may be any type of threaded fastener. The adjustment feature may be another bend in the material, which can be adjusted by bending in a certain direction to increase or decrease the biasing force of the clamping mechanism. The adjustment feature may be adjusted by using a screwdriver, alien key, torx key or any similar type of tool.

At least one of the first and second parts of the clamping mechanism may comprise at least one grip element. The grip elements may be knurled, pressed, holed, chamfered, serrated, slotted etc. The at least one grip element may increase the friction between the clamping mechanism and the earth cable. The at least one grip element may also assist in piercing an insulation layer around an earth cable, resulting in electrical contact. The grip elements may prevent the earth cable from slipping out of the clamping mechanism.

The grip elements may be located anywhere on the earth cable connector portion. They may be located on an edge, bend, or on a flat section of the earth cable connector portion. If the first and second parts engage with one another, there may be grip elements at this location on one or both parts. The grip elements may be located at the distal end or proximal end of the earth cable connector portion. The grip elements may be located opposite each other, to create a high friction clamping mechanism.

In use, it will be understood that an earth cable will be inserted into the clamping mechanism along a certain direction. In embodiments comprising a grip element along an edge (e.g. a distal end) or bend, the grip element may be oriented generally along the direction of insertion or may be oriented generally against or generally perpendicular to the direction of insertion. The grip element orientation may be selected to be optimised for a particular purpose, such as penetrating insulation, mechanical pull resistance etc.

In some embodiments, the first and/or second part has a grip element oriented to tighten against an earth cable disposed therebetween, when the earth cable is pulled. For example, a part of the first and/or second part comprising a said grip element may be oriented at an acute angle with respect to an insertion direction.

In a second aspect of the present invention, there is provided a method for establishing electrical connection between an earth cable and a component to be earthed, the method comprising:

- providing a device according to the first aspect;
- securing the device to the component to be earthed; and
- securing the earth cable to the device, by resiliently deforming the clamping mechanism and inserting the cable between the first and second parts of the earth cable connector portion.

Resiliently deforming the clamping mechanism may be done manually, for example using one's fingers to squeeze or otherwise resiliently deform the clamping mechanism. Alternatively, the earth cable may be forcefully inserted into the clamping mechanism, thereby opening it wide enough for the cable to be placed therebetween. After resiliently deforming the clamping mechanism, the earth cable may be inserted into an earth cable aperture, before releasing the clamping mechanism, to attach the earth cable to the device. In embodiments wherein the device comprises an adjustment feature, the adjustment feature may be adjusted after inserting the earth cable into the clamping mechanism.

The clamping mechanism may be resiliently deformed by prying, using a tool such as a screwdriver.

The invention extends in a further aspect to disconnecting an electrical cable from the clamping mechanism of the device disclosed herein, comprising by prying or otherwise deflecting the first and second parts of the clamping mechanism, so as to release the earthing cable.

The method described provides an easy and efficient way of connecting an earth cable to a component to be earthed. The earth cable may be stripped of its insulation before securing to the device. Alternatively, the clamping mechanism may pierce any insulation on the earth cable, eliminating the need to remove any insulation from the earth cable.

The component to be earthed may be a cable gland, the cable gland may comprise a male threaded fastener and corresponding female threaded fastener.

The device may be secured to the cable gland by inserting the device between the male threaded fastener and the corresponding female threaded fastener. This may ensure mechanical and electrical contact is made between the earth cable and the component to be earthed.

Further optional features disclosed in relation to each aspect of the invention correspond to further optional features of each other aspect of the invention. For example, the use of the corresponding optional features of the apparatus disclosed herein correspond to optional features of the methods disclosed herein. Moreover, where the function and operation of the various features of the apparatus disclosed herein are discussed, it should be appreciated that the methods disclosed herein may include corresponding steps of such function or operation of the apparatus.

BRIEF DESCRIPTION OF THE DRAWINGS

Non-limiting example embodiments the present invention will now be described with reference to the accompanying drawings in which.

DETAILED DESCRIPTION

Figure 1:
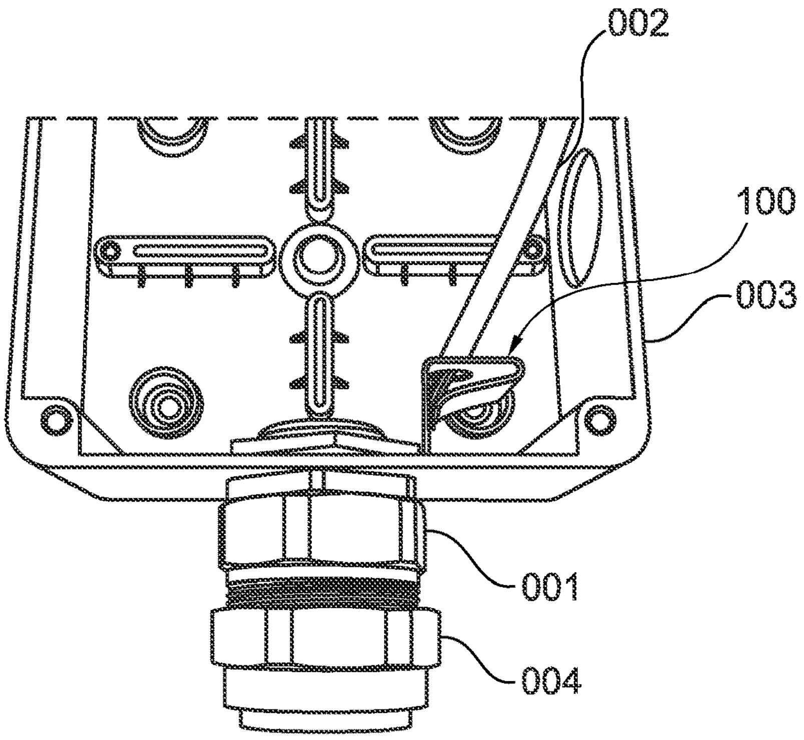
FIG. 1 shows a device according to an embodiment of the present invention, located inside a cable housing connected to a cable gland.

FIG. 1 shows a device 100 according to an embodiment of the present invention. The device 100 is located inside a cable housing 003. The cable housing has a cable gland 004 which terminates in the housing. Housings such as housing 003 shown in FIG. 1 are typically made from an insulating material such as a plastics material. Cable glands which may have steel wire armour (SWA) around them terminate in such housings, and require to be earthed, usually via an earth cable 002, as discussed below.

Figure 2:
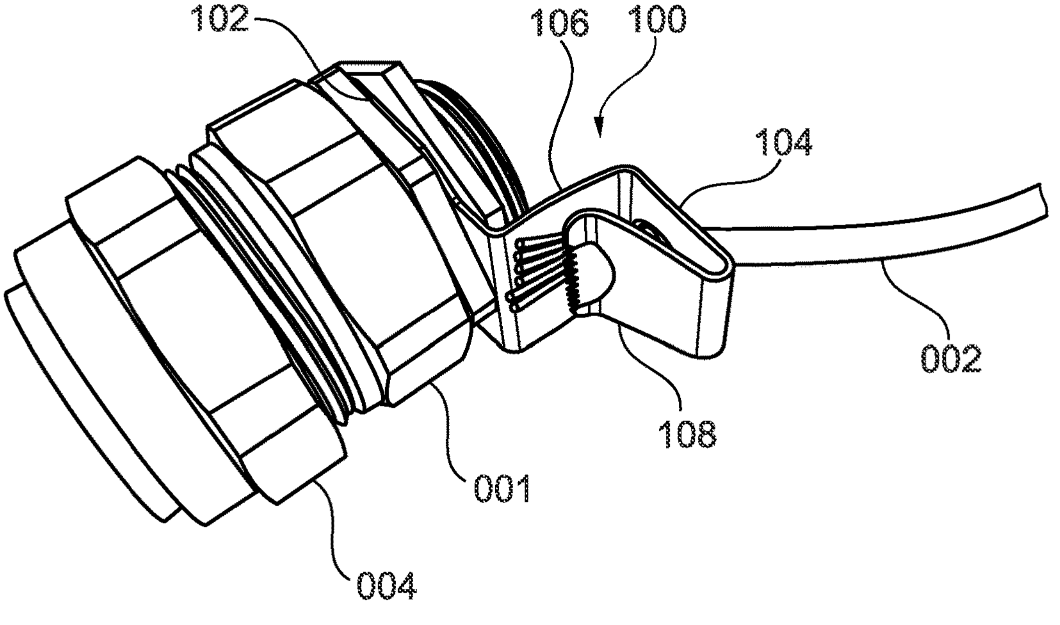
FIG. 2 shows an embodiment of the present invention connected to a cable gland.

As shown in FIGS. 1 and 2, the device 100 comprises an earthing device connector portion 102 for connecting the electrical earthing device 100 to the component to be earthed 002. In FIGS. 1 and 2, the component to be earthed 001 is a cable gland 004 which is coupled in use to the steel armour of an armoured cable. The invention should not be construed as being limited to electrical earthing of such cable glands, and can be applied to other types of electrical cable and/or other components, fixtures or fittings.

The cable gland 004 is made from an electrically conductive material, such as copper, to provide electrical connection to the SWA (not shown). Therefore, if the device 100 is connected to the cable gland 004, then there will be an electrical connection established between the SWA, the gland 004 and the device 100.

The device 100 further comprises an earth cable connector portion 104, which is for connecting to an earth cable 002. As easily seen in FIG. 2, the earth cable connector portion 104 comprises a first part 106 and a second part 108, which are disposed so as to define a clamping mechanism. The clamping mechanism is suited to retain an inserted earth cable 002, ensuring constant electrical connection between the earth cable 002 and the device 100. The labeling in the figures of the first part 106 and the second part 108 should not be construed to be limiting, as the portion currently labeled the first part 106 may easily be labeled the second part 108, and vice versa.

The first and second parts 106/108 are resiliently deformable in relation to one another, to allow the earth cable 002 to be positioned therebetween. The first and second parts 106/108 may be deformed by using a screwdriver, by hand, or by the earth cable 002 itself. To release the earth cable 002, the clamping mechanism may be opened by moving the first and second parts 106/108 away from one another. This may be done by using a tool, or by hand. When the earth cable 002 is positioned between the first part 106 and the second part 108, the clamping mechanism retains by resilient biasing and maintains the earth cable 002 in mechanical and electrical contact with the device 100. The biasing force keeping the earth cable 002 in place will depend upon the application and the thickness of the earth cable.

As shown in the figures, the earthing device connector portion 102 and the earth device connector portion 104 are electrically and mechanically connected together. The device 100 in the figures is also made from a single material (such as those described in the summary section) and is of unitary construction (i.e. formed from a single piece of the material). This enables the device 100 to be more easily manufactured than multi-component devices. In alternative embodiments (not shown), the earthing device is formed from multiple parts, however, which may be welded, pressed, bolted, riveted or otherwise coupled together.

The cable gland 004 as shown in FIGS. 1 and 2 comprises a male threaded fastener 006 and a female threaded fastener 008. In this particular embodiment, the male threaded fastener 006 is a bolt and the female threaded fastener 008 is a nut. In a typical installment process, the gland 004 would be inserted into the housing via the male threaded fastener 006. The device 100 would then be connected to the cable gland 004 via the earthing device connector portion 102. The female threaded fastener 008 would then be threaded onto the male threaded fastener 006, thus securing the cable gland 004 to the housing and the device 100 to the cable gland. After this, the earth cable 002 would be placed between the clamping mechanism of the device (between the first and second parts 106/108 of the earth cable connector portion 104). The earth cable 002 may need to be stripped of any insulation before inserting into the clamping mechanism of the device 100, to ensure electrical contact. Alternatively, the first and second parts 106/108 may be sharp enough to pierce through the insulation on the earth cable 002, removing the necessity of stripping the insulation.

Figure 3:
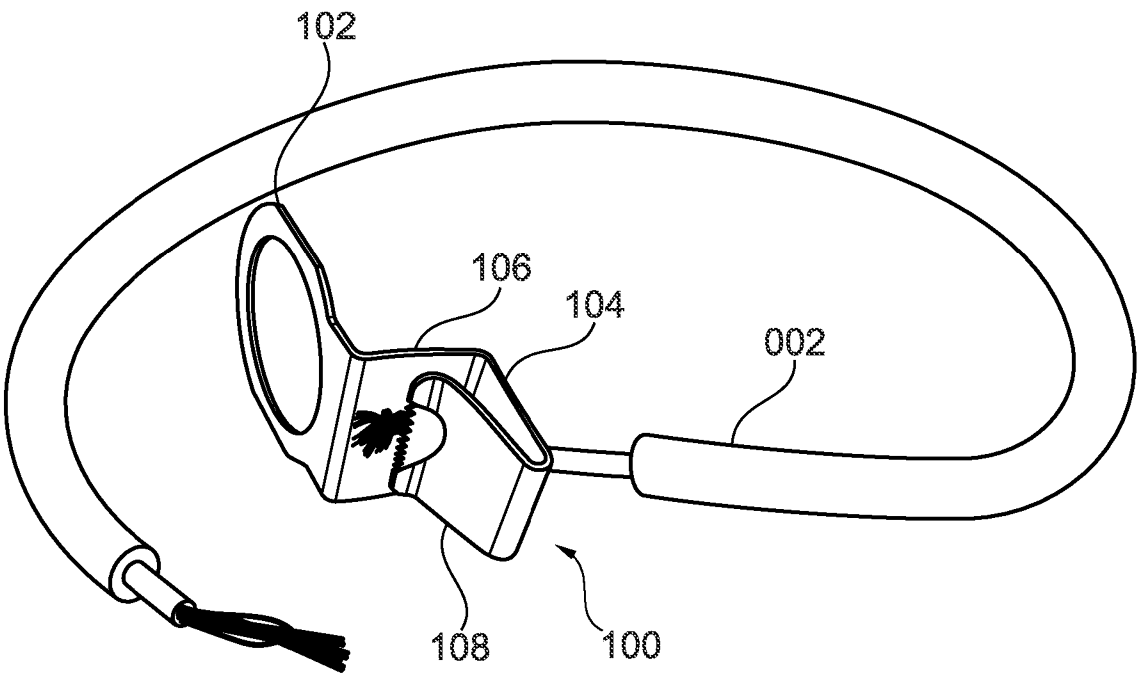
FIGS. 3 and 4 show two views of an embodiment of the present invention connected to an earth cable.
Figure 4:
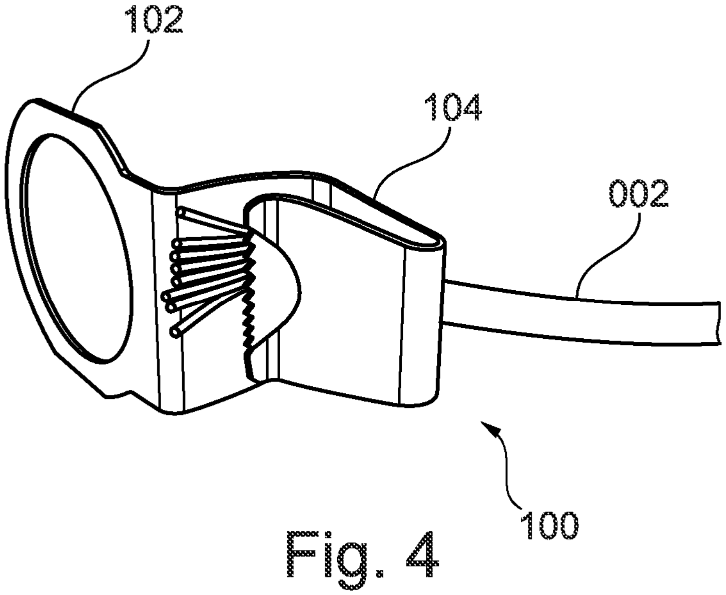

As shown in FIGS. 3 and 4, the earthing device connector portion 102 may be shaped to encircle the male threaded fastener 006 of the cable gland. As may be easily envisaged, the earthing device connector portion 102 may only partly encircle the male threaded component of the cable gland 006. The earthing device connector portion 102 shown in FIGS. 1 to 4 functions as a washer. Alternatively, the earthing device connector portion 102 may clip onto the component to be earthed 001.

Figure 5:
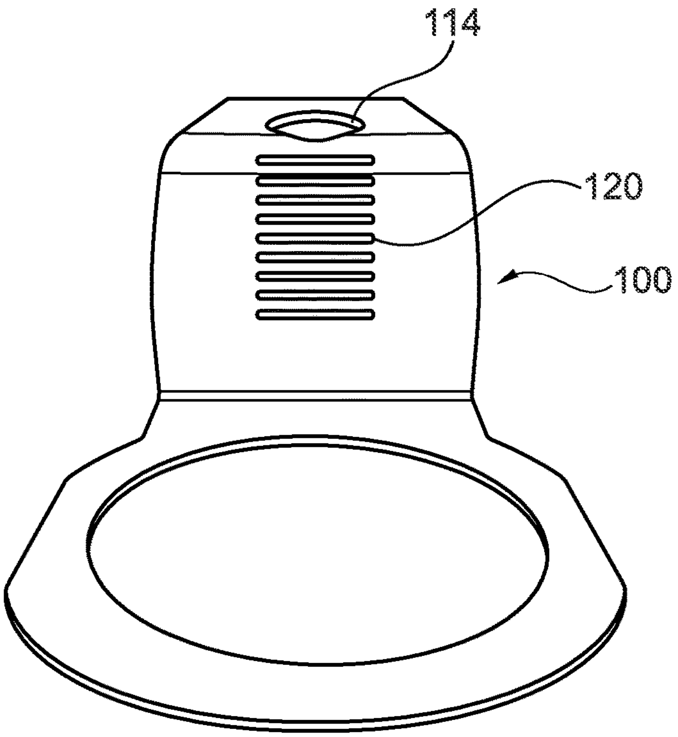
FIGS. 5 and 6 show two views of another embodiment of the present invention, wherein the embodiment comprises at least one grip element.
Figure 6:
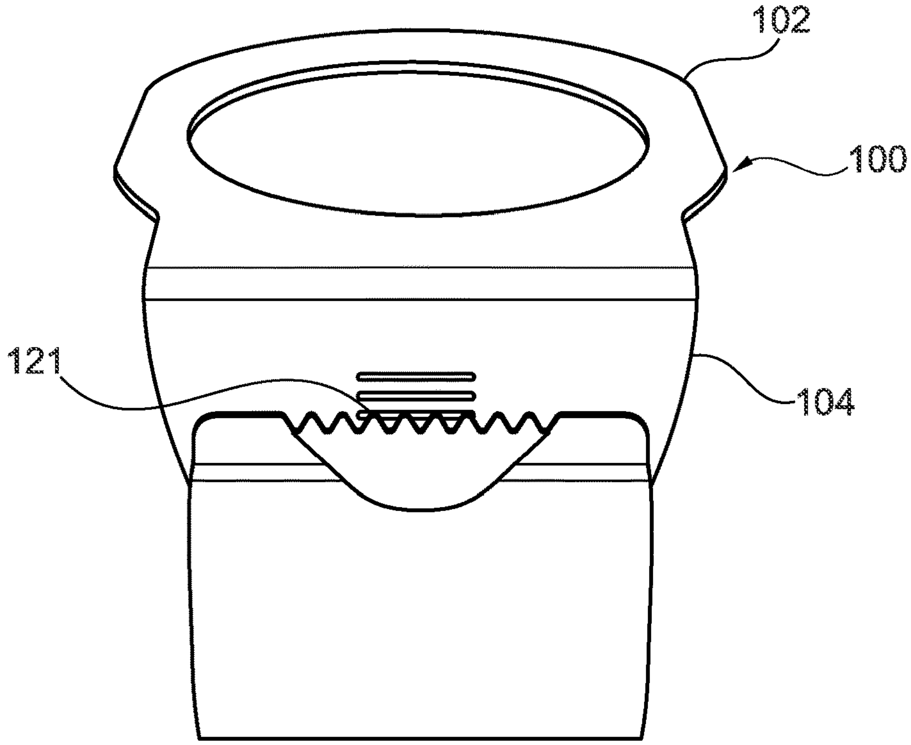
Figure 7:
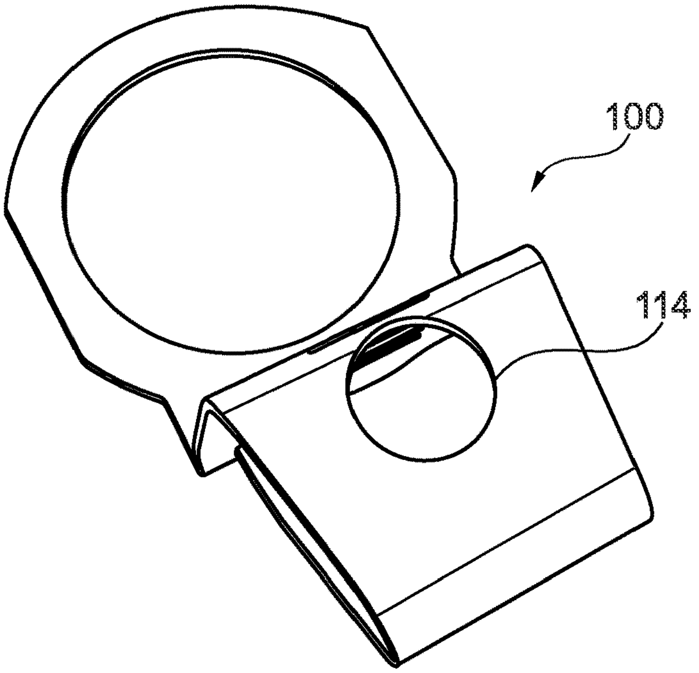
FIG. 7 shows a view of the top of the device shown in FIGS. 5 and 6.

FIGS. 5 to 7 show various views of the device 100 according to the present invention. The device 100 further comprises a grip element 120 as seen in FIG. 5 and a grip element 121 as seen in FIG. 6. The grip elements 120,121 may be used in combination with any other embodiment disclosed herein.

As best seen in FIG. 5, the grip elements 120 may be located on the first part 106 of the earth cable connector portion. The grip elements 120 as shown are slots, which provide a high friction surface to retain the earth cable 002. The slots should not be viewed as being limiting, as there may be any type of geometry used to increase the friction on the earth cable when in use.

As seen in FIG. 6, the grip elements 121 may also be on the second part 108 of the earth cable connector portion. The grip elements 121 as shown here are a serrated edge. The serrations may be stamped, pressed, or cut. There may be any other type of grip element 121 used to increase the friction of the clamping mechanism in use. Again, the grip element 121 as shown may pierce the insulation of the earth cable 002 which is to be inserted. The grip element 121 may be located on any edge to provide increased friction.

The grip element 121 may also be located on a bend, and at the proximal or distal ends 124/126 of the earth cable connector portion.

Figure 8:
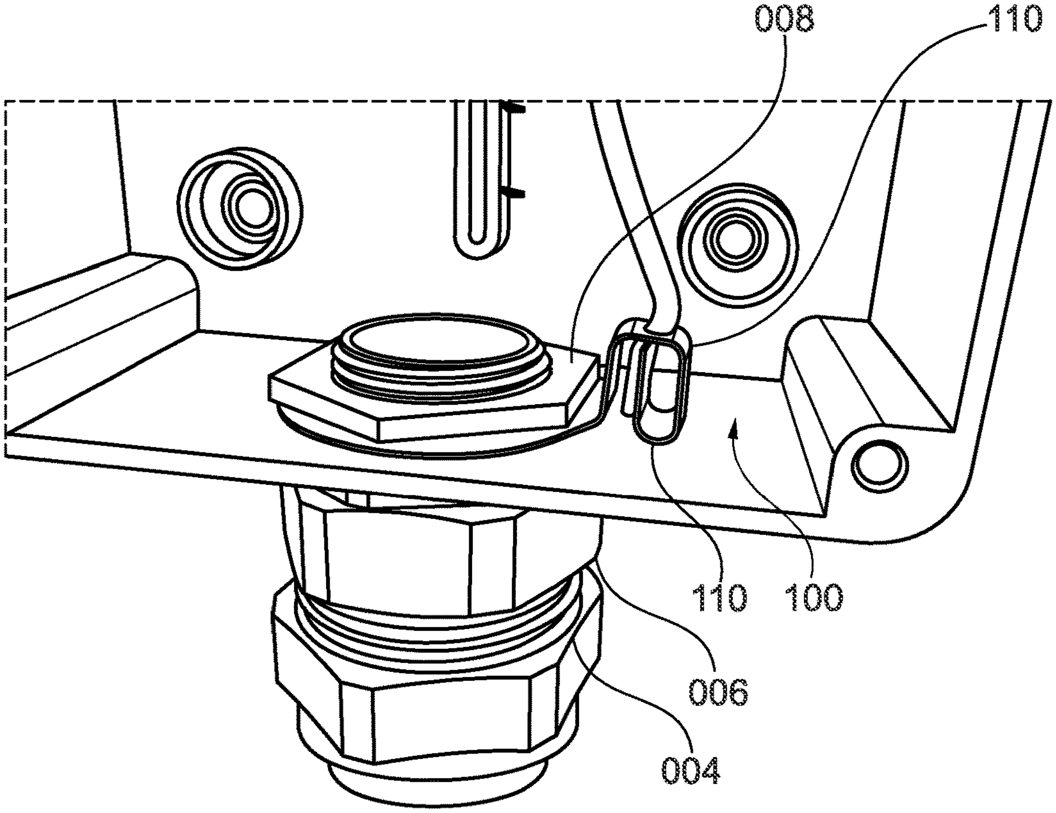
FIG. 8 shows another embodiment of the present invention, located inside a cable housing and connected to a cable gland.

An earth cable aperture 114 can also be seen in FIGS. 5 to 8. In FIG. 8, the earth cable 002 can clearly be seen to go through the earth cable aperture 114. There may be more than one earth cable aperture 114 if the geometry of the device requires it.

Figure 9:
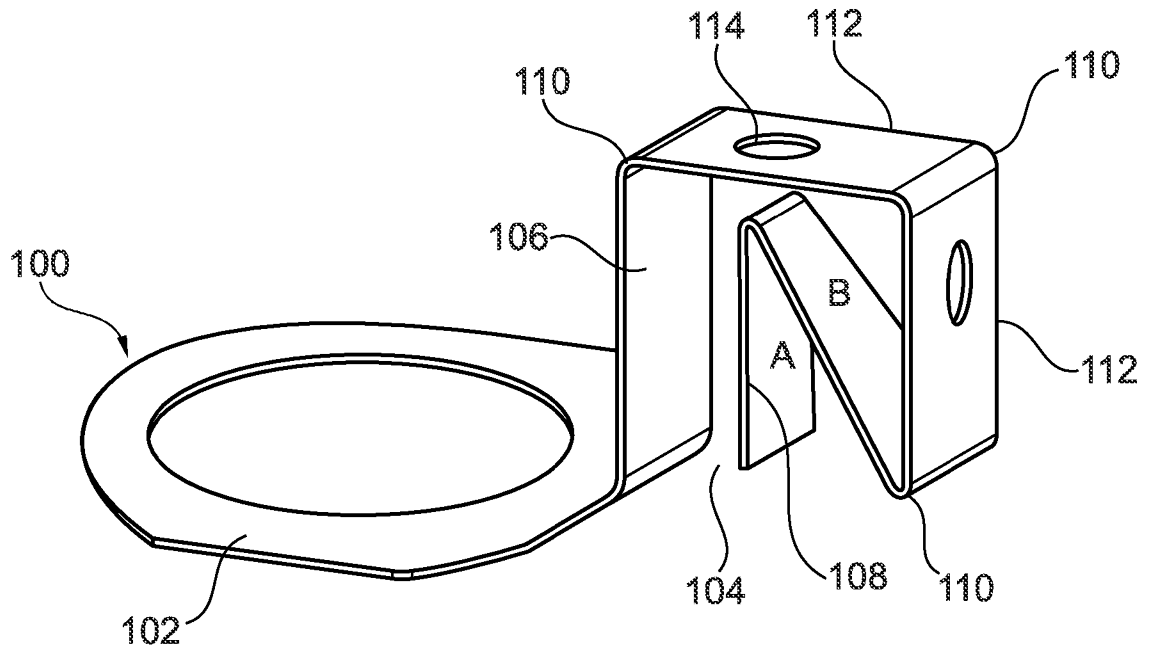
FIGS. 9 to 11 show simplified embodiments according to the present invention, showing various arrangements of the earth cable connector portion.
Figure 10:
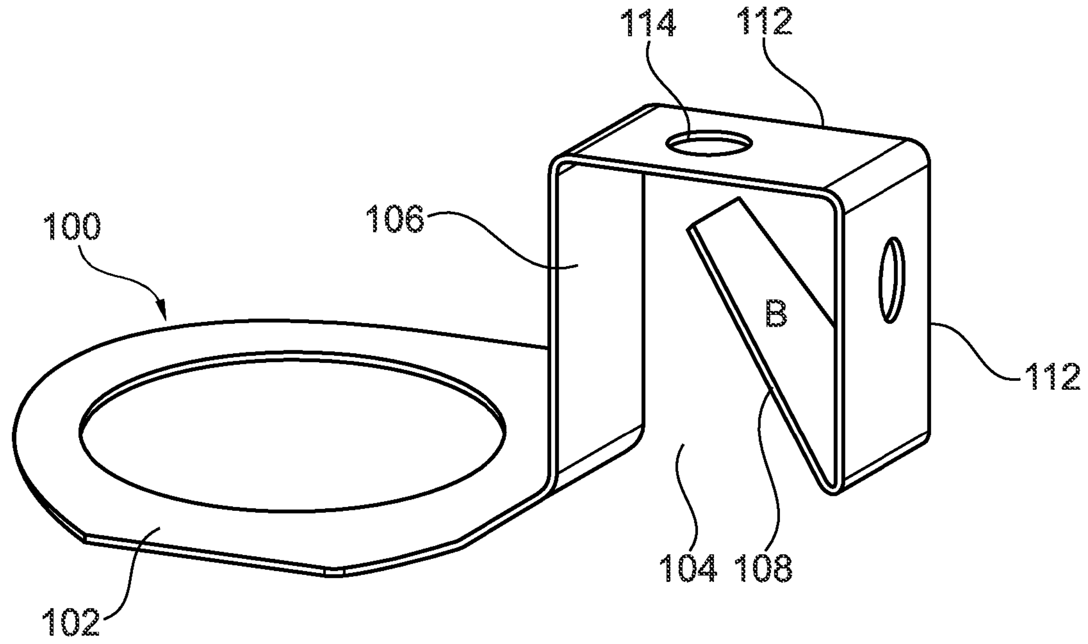
Figure 11:
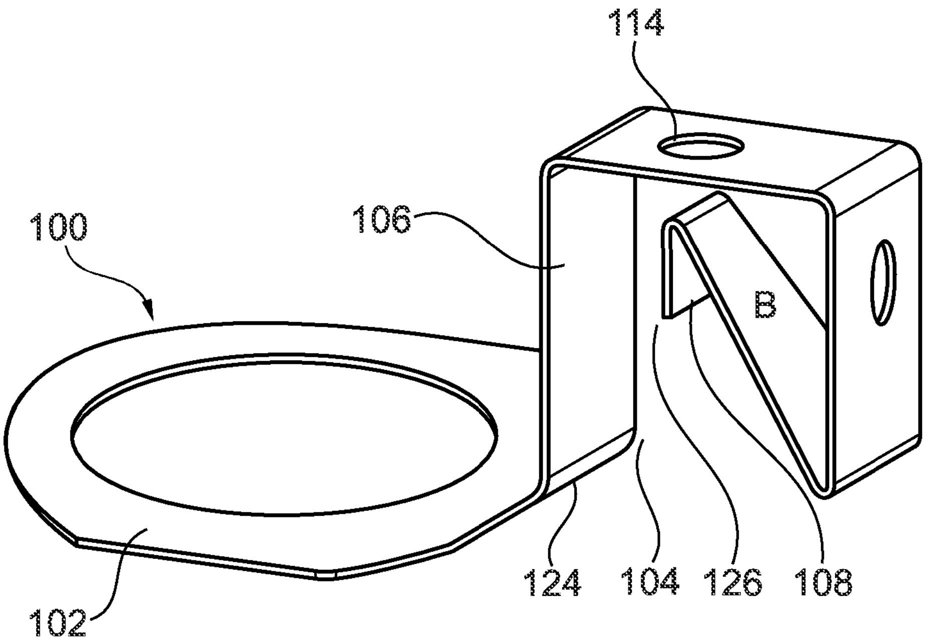

FIGS. 9 to 11 show further embodiments of an earthing device 100, showing various arrangements of the earth cable connector portion 104. The earth cable connector portion 104 may comprise a bend 110, or a plurality of bends 110. There may be one continuous bend, wherein the bend creates the first part 106 and the second part 108 of the earth cable connector portion 102. The bends 110 may provide the spring force required to create the clamping mechanism. The material which the device 100 is made from may also provide the spring force required.

In FIGS. 9 to 11, the second part 108 of the earth cable connector portion 104 is toward the distal end 126 of the earth cable connector portion 104. The distal end 126 is defined as being the end furthest from the earthing device connector portion 104. The proximal end 124 is shown joined to the earthing device connector portion. The second part 108 may form the end of the earth cable connector portion 104 in one section, as in FIG. 10, or in a plurality of sections, such as in FIGS. 9 and 11. The features on the second part 108 in FIGS. 9 and 11 may provide more friction when gripping the earth cable 002, than other embodiments.

An intermediate part 112 can be seen in FIGS. 9 and 10, which connects the first and second parts 106/108. The intermediate part 112 may serve as a bridge to adjust the geometry of the clamping mechanism, to suit a different range of earth cables for example. The intermediate part 112 may also be used to alter the geometry of the device 100 so that it fits in a special application, such as a specific junction box.

Figure 12:
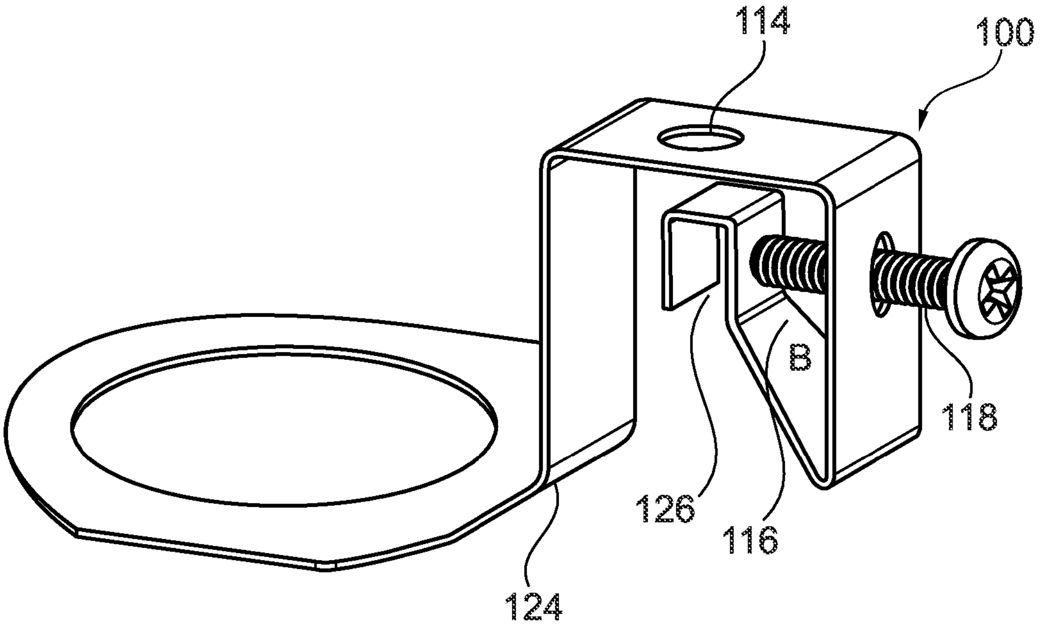
FIG. 12 shows another embodiment of the present invention, wherein the device comprises an adjustment feature.

FIG. 12 shows another embodiment of the present invention, wherein the device 100 comprises an adjustment feature 116. The adjustment feature 116 as shown comprises an adjustor 118, used to adjust the biasing force of the clamping mechanism. In the embodiment shown, the adjustor 118 is a grub screw, which is threaded into the adjustment feature 116. Alternative adjustors, such as a nut and bolt combination may also be used. The adjustor 118 may be used to increase the pressure exerted onto the earth cable 002 by the clamping mechanism. The adjustor 118 provides the clamping mechanism additional pull resistance, as required for some applications of the device 100, preventing the earth cable 002 from working loose and out of the device 100. As should be easily envisaged, the adjustor 118 may be in a different location to that shown in FIG. 12, whilst still serving its purpose.

Figure 13:
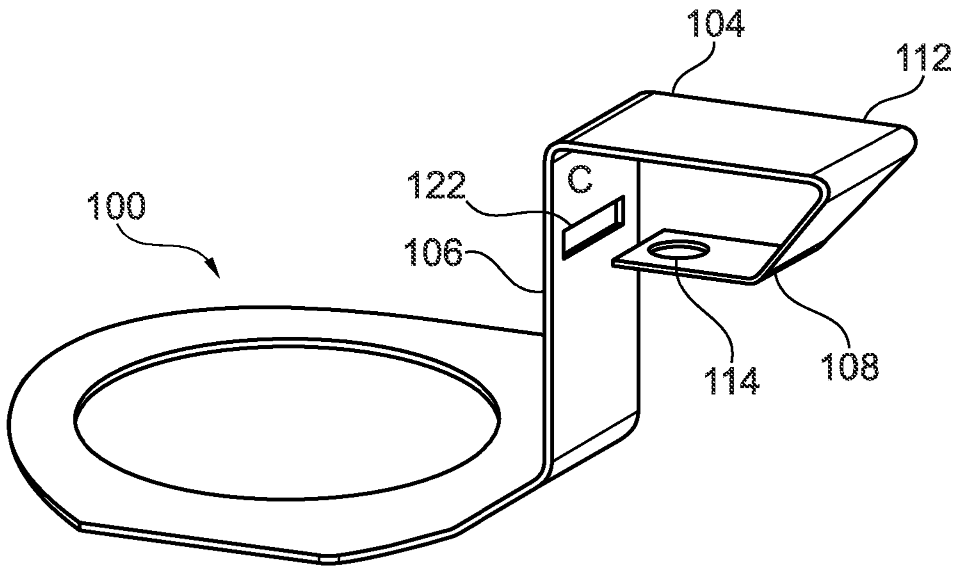
FIG. 13 shows another embodiment of the present invention, only showing the earth cable connector portion.
Figure 14:
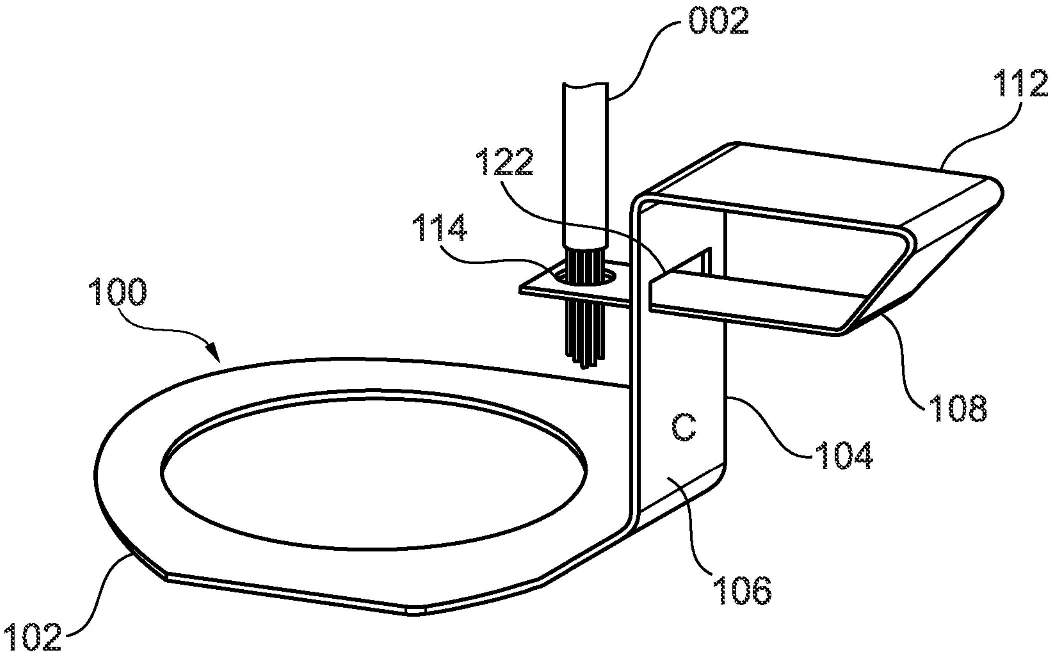
FIG. 14 shows an embodiment of the present invention according to FIG. 13, further showing the earthing device connector portion.

FIGS. 13 and 14 show another embodiment of the present invention. The device 100 comprises an earthing device connector portion 102 (FIG. 14), and an earth cable connector portion 104. The earth cable connector portion 102 comprises a first part 106, a second part 108, and an intermediate part 112. The first part 106 comprises a slot 122 which is shaped to allow at least a portion of second part 108 of the earth cable connector portion to pass through it. The second part 108 comprises an earth cable aperture 114.

When manufactured, the earth cable connector portion 104 is shaped as shown in FIG. 13. The first and second portions 106/108 define the clamping mechanism and are resiliently deformable in relation to one another. To connect an earth cable 002 to the device 100, the second part must first be passed through the slot 122 in the first part 106 and held in place (as in FIG. 14). When the second part 108 is moved into the position shown in FIG. 14, there is a retarding force which seeks to return the second part 108 to its original position as shown in FIG. 13. The earth cable 002 is then inserted into the earth cable aperture 114. When the second part 108 is released, it traps the earth cable 002 between the slot 122 and the first part 106. To permit removal of the earth cable 002 from the device 100, the tension on the clamping mechanism is released by moving part 108 further through the slot 122.

The slot 122 as shown is rectangular in shape, however this should not be construed to be limiting, as the slot 122 may be any suitable shape to enable the clamping mechanism to function as described. The slot 122 may also extend to one edge of the first part 106, thereby creating a channel for the second part 108 to be placed into.

Whilst specific embodiments of the present invention have been described above, it will be appreciated that departures from the described embodiments may still fall within the scope of the present invention.

The invention claimed is:

1. An electrical earthing device, comprising:

an earthing device connector portion, for connection of the electrical earthing device to a component to be earthed, wherein the component to be earthed is a cable gland and the cable gland comprises a male threaded fastener and a corresponding female threaded fastener; and an earth cable connector portion, for connection to an earth cable;

wherein a first part of the earth cable connector portion is disposed in relation to a second part of the earth cable connector portion so as to define a clamping mechanism, and wherein the first part of the earth cable connector portion comprises a slot to allow at least a portion of the second part of the earth cable connector portion to pass through the slot, and wherein the second part comprises an earth cable aperture; and wherein the first and second parts are resiliently deformable in relation to one another, and wherein, when in use, and after the second part of the earth cable portion has been passed through the slot, the earth cable is positioned inside of the earth cable aperture and is retained in position and maintained in electrical contact with the clamping mechanism by resilient biasing between the first and second parts of the clamping mechanism;

wherein the electrical earthing device is of unitary construction and formed of a sheet of material and wherein the earthing device connector portion is for encircling, at least in part, the male threaded fastener of the cable gland.

2. The electrical earthing device according to claim 1, wherein the earthing device connector portion is shaped to fit onto a cable gland.

3. The electrical earthing device according to claim 1, wherein the earth cable connector portion comprises at least one bend.

4. The electrical earthing device according to claim 1, wherein at least one of the first and second parts are toward the distal end of the earth cable connector portion.

5. The electrical earthing device according to claim 1, wherein the earth cable connector portion comprises an earth cable aperture.

6. The electrical earthing device according to claim 1, wherein at least one of the first and second parts of the clamping mechanism comprises at least one grip element.

7. The electrical earthing device according to claim 1, wherein the earth cable connector portion has at least one intermediate part connecting the first part and the second part.

8. A method, comprising the steps of:

providing an electrical earthing device having an earthing device connector portion, for connection of the electrical earthing device to a component to be earthed, wherein the component to be earthed is a cable gland and the cable gland comprises a male threaded fastener and a corresponding female threaded fastener; and an earth cable connector portion, for connection to an earth cable; wherein a first part of the earth cable connector portion is disposed in relation to a second part of the earth cable connector portion so as to define a clamping mechanism, and wherein the first part of the earth cable connector portion comprises a slot to allow at least a portion of the second part of the earth cable connector portion to pass through the slot, and wherein the second part comprises an earth cable aperture; and wherein the first and second parts are resiliently deformable in relation to one another for, and wherein, when in use, and after the second part of the earth cable portion has been passed through the slot, the earth cable is positioned inside of the earth cable aperture and is retained in position and maintained in electrical contact with the clamping mechanism by resilient biasing between the first and second parts of the clamping mechanism;

wherein the electrical earthing device is of unitary construction and formed of a sheet of material and wherein the earthing device connector portion is for encircling, at least in part, the male threaded fastener of the cable gland;

securing the electrical earthing device to the earth cable; and securing the earth cable to the electrical earthing device, by resiliently deforming the clamping mechanism and inserting the cable between the first and second parts of the earth cable connector portion.

9. The method according to claim 8, wherein the electrical earthing device is secured to the cable gland by inserting the electrical earthing device between the male threaded fastener and the corresponding female threaded fastener.

10. A method, comprising the steps of:

providing a sheet material;

conducting one or more steps of one or more of a bending, a roll forming, a stamping and a pressing of the sheet material to form an electrical earthing device; and producing from said sheet material an electrical earthing device formed from a sheet material having an earthing device connector portion, for connection of the electrical earthing device to a component to be earthed, wherein the component to be earthed is a cable gland and the cable gland comprises a male threaded fastener and a corresponding female threaded fastener; and an earth cable connector portion, for connection to an earth cable; wherein a first part of the earth cable connector portion is disposed in relation to a second part of the earth cable connector portion so as to define a clamping mechanism, and wherein the first part of the earth cable connector portion comprises a slot to allow at least a portion of the second part of the earth cable connector portion to pass through the slot, and wherein the second part comprises an earth cable aperture; and wherein the first and second parts are resiliently deformable in relation to one another, and wherein, when in use, and after the second part of the earth cable portion has been passed through the slot, the earth cable is positioned inside of the earth cable aperture and is retained in position and maintained in electrical contact with the clamping mechanism by resilient biasing between the first and second parts of the clamping mechanism;

wherein the electrical earthing device is of unitary construction and formed of a sheet of material and wherein the earthing device connector portion is for encircling, at least in part, the male threaded fastener of the cable gland.

11. The method according to claim 10, further comprising the step of:

creating an outline of a device pattern on a sheet of material; and subsequently conducting one or more steps of one or more of bending, roll forming, stamping and pressing the sheet material to form said electrical earthing device.

12. The method according to claim 11, wherein the step of creating the outline comprises machining or stamping.

13. The method according to claim 11, further comprising the step of:

creating a plurality of electrical earthing devices from a single sheet of material.

14. The method according to claim 13, further comprising the step of:

creating an outline of the plurality of said electrical earthing devices, by stamping or machining blanks from a single sheet of material and then conducting the one or more steps of one or more of bending, roll forming, stamping and pressing the sheet material to form each said electrical earthing device.

* * * * *